(12) United States Patent
Tozuka et al.

(10) Patent No.: US 8,763,746 B2
(45) Date of Patent: Jul. 1, 2014

(54) MOUNTING STRUCTURE OF HANDLE SWITCH DEVICE

(71) Applicant: Toyo Denso Kabushiki Kaisha, Tokyo (JP)

(72) Inventors: Tsutomu Tozuka, Fukaya (JP); Shigeharu Nazu, Tokyo (JP); Keisuke Hojo, Kawagoe (JP)

(73) Assignee: Toyo Denso Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/691,084

(22) Filed: Nov. 30, 2012

(65) Prior Publication Data

US 2013/0140154 A1    Jun. 6, 2013

(30) Foreign Application Priority Data

Dec. 2, 2011  (JP) ................. 2011-264527

(51) Int. Cl.
*B60K 20/06*    (2006.01)
*H01H 9/06*    (2006.01)
*B62K 11/14*    (2006.01)

(52) U.S. Cl.
CPC . *B62K 11/14* (2013.01); *H01H 9/06* (2013.01)
USPC ........ 180/315; 200/61.85; 200/312; 200/314; 74/551.8

(58) Field of Classification Search
CPC .......... B62K 11/14; B62K 9/06; B62K 23/02; B62J 6/16; H01H 9/06; H01H 9/24; H01H 2009/068; H01H 2009/066
USPC ............ 180/315, 333, 334; 200/61.54, 61.85, 200/312, 314; 74/551.8
See application file for complete search history.

(56) References Cited

U.S. PATENT DOCUMENTS

| | | | | |
|---|---|---|---|---|
| 4,191,866 A | * | 3/1980 | Nakajima et al. | 200/4 |
| 4,192,767 A | * | 3/1980 | Flournoy et al. | 516/60 |
| 4,213,513 A | * | 7/1980 | Beck | 180/272 |
| 4,565,909 A | * | 1/1986 | Yashima et al. | 200/61.85 |
| 4,710,599 A | * | 12/1987 | Motodate et al. | 200/61.85 |
| 6,631,656 B2 | * | 10/2003 | Ase et al. | 74/551.8 |
| 6,695,090 B2 | * | 2/2004 | McAllister | 180/333 |
| 6,750,411 B2 | * | 6/2004 | Janisch | 200/61.85 |

(Continued)

FOREIGN PATENT DOCUMENTS

| | | |
|---|---|---|
| DE | 10 2007 037 483 | 2/2009 |
| JP | 5-92928 | 12/1993 |
| JP | 2007-318453 | 12/2007 |

*Primary Examiner* — Paul N Dickson
*Assistant Examiner* — Darlene P Condra
(74) *Attorney, Agent, or Firm* — Cozen O'Connor

(57) ABSTRACT

A mounting structure of a handle switch device with which a panel can be replaced by manipulating fasteners for fastening two outer casings of the handle switch device together. A rear casing is temporarily mounted to an inner casing that is mounted to a handle pipe, engagement pieces of a design panel are inserted through through holes of a front casing, and the front and rear casings are fastened together by mounting screws, thereby completing assemblage of the handle switch device. To replace the design panel, the mounting screws are loosened to bring them into a half-engagement state and the front casing is displaced toward a driver side to disengage projection ribs of the inner casing from the through holes. Next, the design panel is dismounted from the front casing, a new design panel is mounted to the front casing, and the mounting screws are tightened.

10 Claims, 11 Drawing Sheets

(56) References Cited

U.S. PATENT DOCUMENTS

| | | | |
|---|---|---|---|
| 6,937,149 B2* | 8/2005 | McMahon | 340/539.11 |
| 7,180,020 B2* | 2/2007 | Onoda et al. | 200/61.54 |
| 7,332,684 B2* | 2/2008 | Tozuka et al. | 200/61.27 |
| 7,402,767 B2* | 7/2008 | Tozuka et al. | 200/61.54 |
| 2002/0020249 A1* | 2/2002 | Darland et al. | 74/551.8 |
| 2003/0032327 A1* | 2/2003 | LaBonte | 439/527 |
| 2008/0180233 A1* | 7/2008 | Miglioranza | 340/432 |
| 2008/0190232 A1* | 8/2008 | Bertini | 74/471 R |
| 2009/0057114 A1* | 3/2009 | Yamamoto | 200/308 |
| 2010/0163331 A1* | 7/2010 | Nakamura | 180/315 |

* cited by examiner

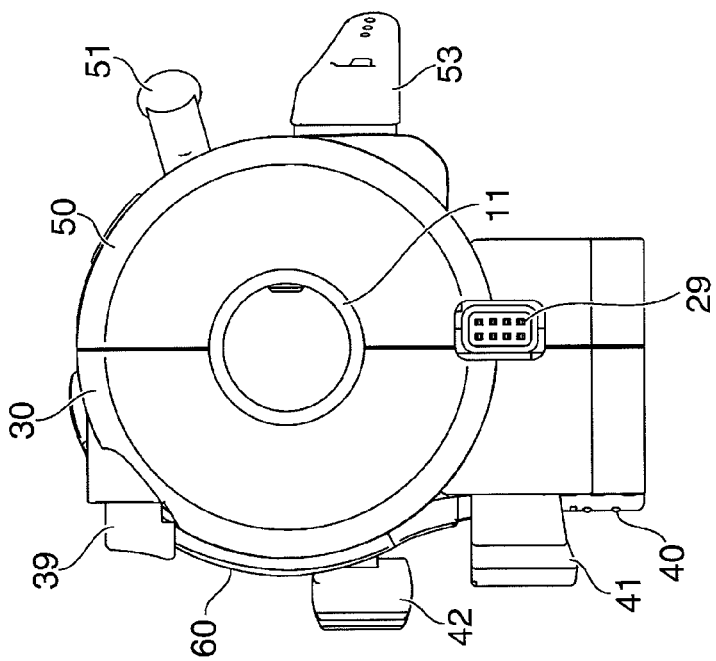
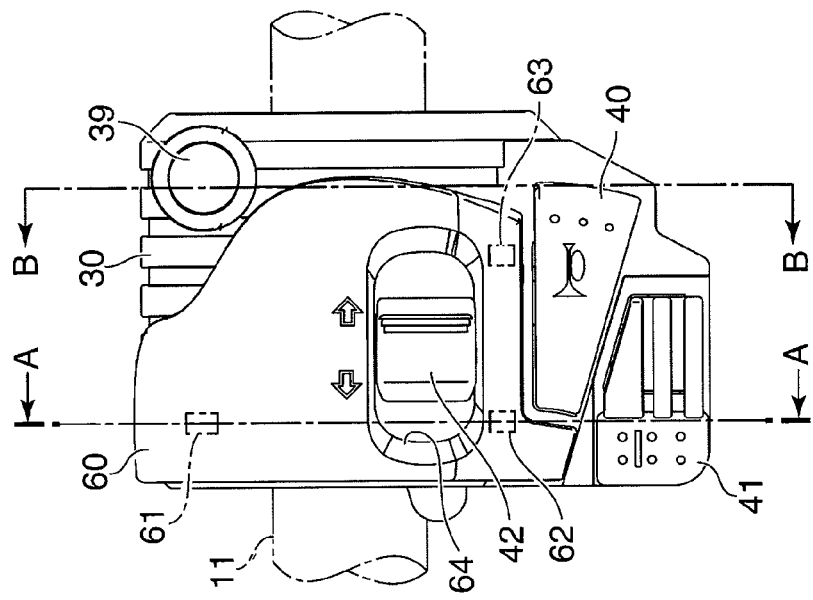
FIG. 3A
FIG. 3B

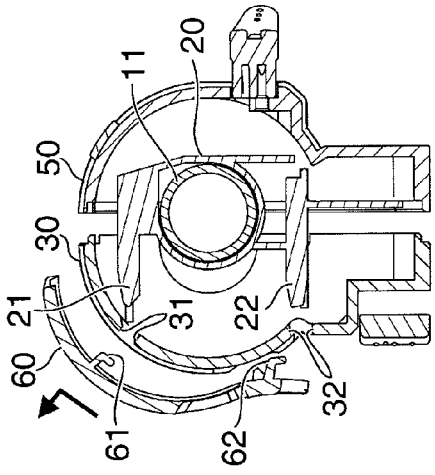
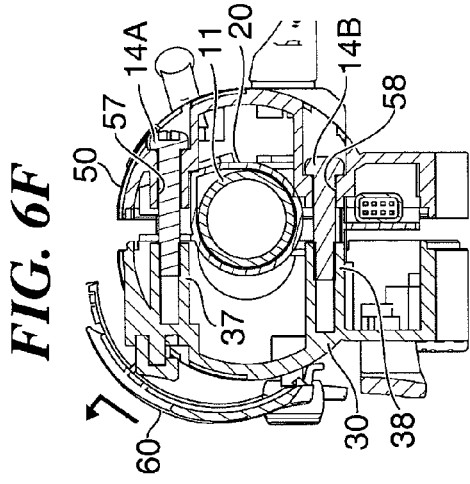
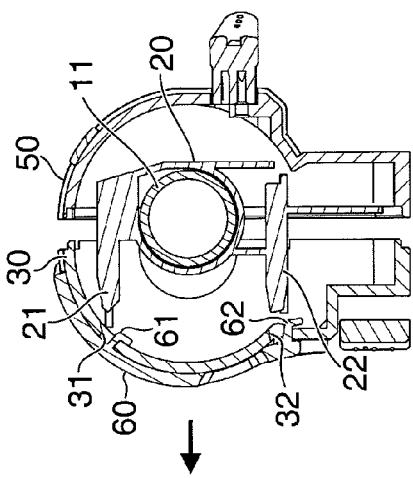
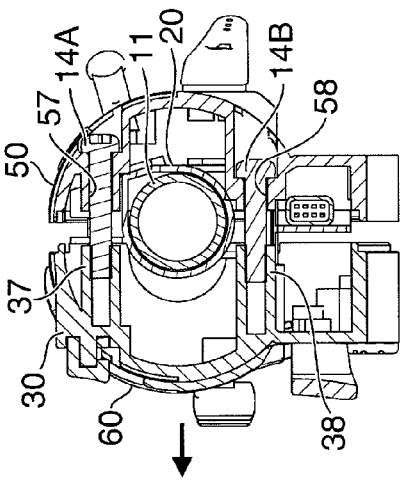
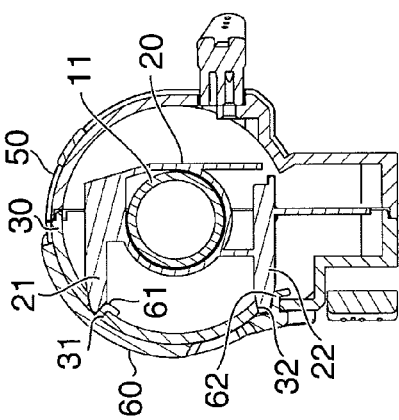
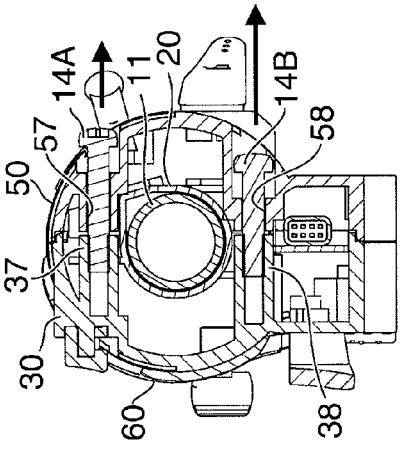

MOUNTING STRUCTURE OF HANDLE SWITCH DEVICE

BACKGROUND OF THE INVENTION

1. Field of the Invention

The present invention relates to a mounting structure of a handle switch device, which is configured to be mounted to a bar handle of a vehicle.

2. Description of the Related Art

Some of vehicles such as motorcycles have a handle switch device that is mounted to a bar handle for steering a wheel. The handle switch device includes, for example, an inner casing disposed on an outer periphery of one end portion of the bar handle, and a two-split outer casing disposed to cover the inner casing. German Laid-open Patent Application No. 102007037483 discloses a multiple switch for a vehicle in which switching units are arranged on an outer surface of a circuit carrier made from plastic.

In a four-wheel car, a design panel, e.g. a woodgrain panel, is mounted to a center console or the like to improve outer appearance.

Japanese Laid-open Patent Publication No. 2007-318453 discloses a portable terminal device having a key sheet that can be subsequently easily replaced by a user according to user's preference. Japanese Laid-open Utility Model Publication No. H5-92928 discloses a switch that can be provided in a shower room or living room and that has a plate mounting frame to which a face plate is mounted.

It is also preferable that a design panel of a vehicle can be replaced according to user's preference. Currently, however, a design panel of a vehicle is not configured on the assumption that there is a case where the design panel is replaced by a user after delivery of vehicle. In other words, the current design panel does not satisfy user's demand to replace the design panel to one of desired design.

Also in a handle switch device mounted to e.g. a bar handle of a motorcycle, it is preferable to improve outer appearance of the device. To this end, an attempt has been made to mount a design panel to the handle switch device.

However, if the resultant handle switch device has a configuration where the design panel cannot be replaced, the user must replace the entire handle switch device for replacement of the design panel or must perform a series of complicated work for replacement, in which the handle switch device is disassembled, the design panel is dismounted, a new design panel is mounted, and the handle switch device is reassembled. On the other hand, if the handle switch device is configured to have a mechanism dedicated for replacement of the design panel, the resultant construction becomes complicated and the number of component parts becomes increases, resulting in increased costs.

SUMMARY OF THE INVENTION

The present invention provides a mounting structure of a handle switch device with which a panel can be replaced by manipulating fasteners for fastening two outer casings of the handle switch device together.

According to this invention, there is provided a mounting structure of a handle switch device configured to be mounted to a bar handle of a vehicle comprising an inner casing provided with switches thereon and configured to be disposed on an outer periphery of the handle, an outer casing assembly comprised of first and second outer casings and disposed on an outer periphery of the inner casing, the first outer casing being formed with at least one through hole, at least one fastener configured to fasten the first and second outer casings together, a panel provided with at least one engagement piece corresponding to the through hole formed in the first outer casing, the panel being configured to be disposed on an outer periphery of the first outer casing in a state that the engagement piece extends through the through hole, and at least one projection provided at least in either the second outer casing or the inner casing, wherein the panel can be mounted to and dismounted from the first outer casing by inserting and disengaging the engagement piece of the panel into and from the through hole of the first outer casing in a state where the first and second outer casings are not fastened together by the fastener, and the panel is fixed to the outer casing assembly by inserting the engagement piece of the panel through the through hole formed in the first outer casing and by engaging the engagement piece of the panel with the projection provided at least in either the second outer casing or the inner casing.

With this invention, the panel can be replaced by manipulating one or more fasteners for fastening the first and second outer casings of the handle switch device together.

Further features of the present invention will become apparent from the following description of exemplary embodiments with reference to the attached drawings.

BRIEF DESCRIPTION OF THE DRAWINGS

FIG. 3A is a front view of the handle switch device;

FIG. 3B is a side view of the handle switch device;

FIGS. 6A to 6C are section views each taken along line A-A shown in FIG. 3A and showing three states of the handle switch device at the time of replacement of the design panel;

FIGS. 6D to 6F are section views each taken along line B-B shown in FIG. 3A and showing three states of the handle switch device;

DESCRIPTION OF THE EMBODIMENTS

The present invention will now be described in detail below with reference to the drawings showing preferred embodiments thereof.

(First Embodiment)

Figure 1:
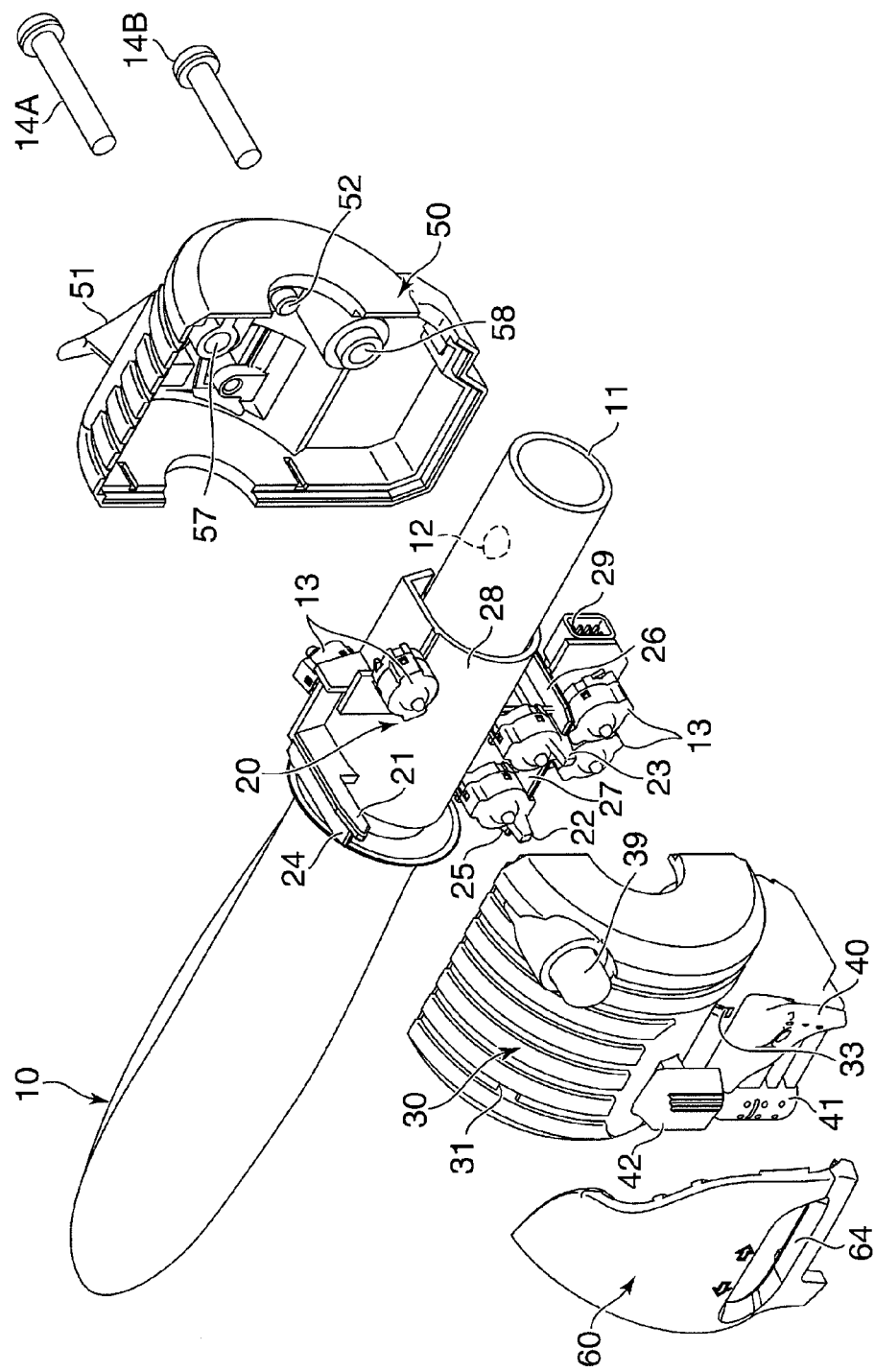
FIG. 1 is an exploded perspective view of a handle switch device to which a mounting structure according to a first embodiment of this invention is applied.
Figure 2:
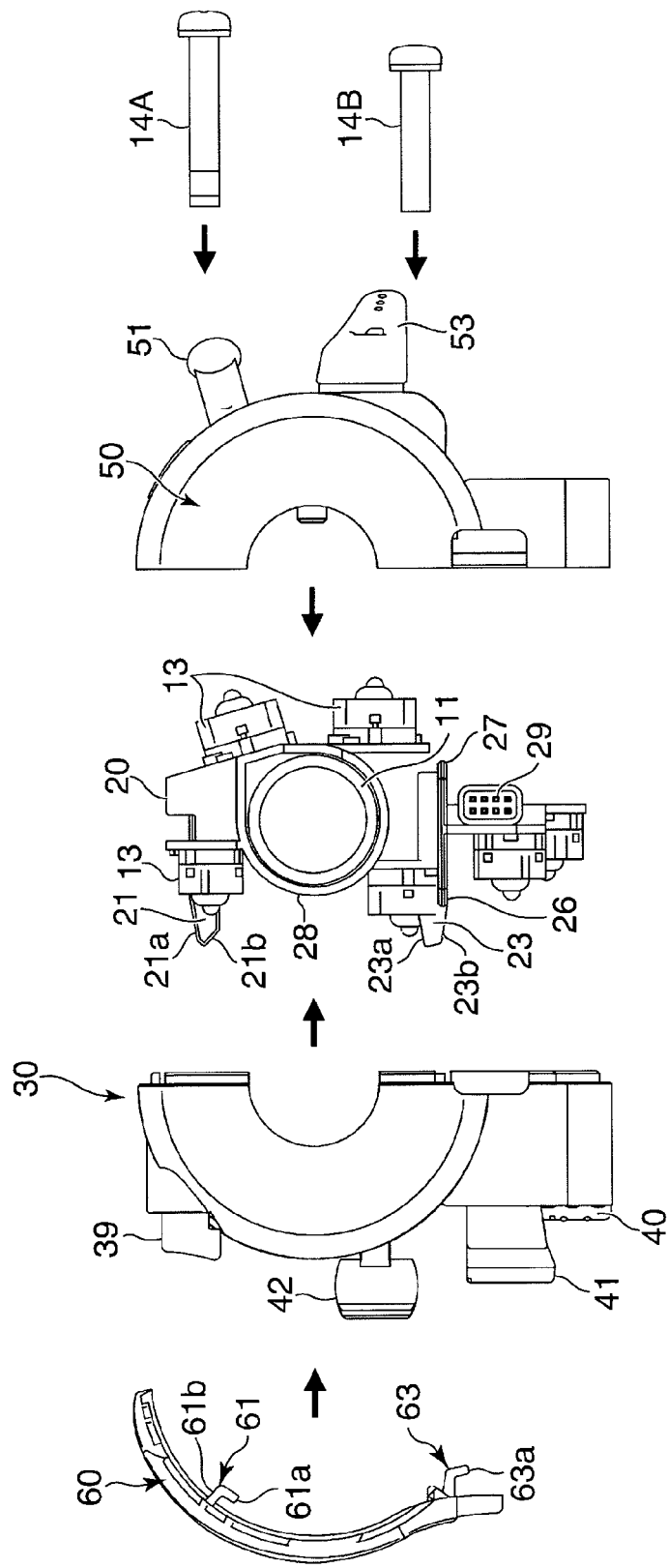
FIG. 2 is an exploded side view of the handle switch device.

FIG. 1 shows in exploded perspective view a handle switch device to which a mounting structure according to a first embodiment of this invention is applied. FIG. 2 shows the handle switch device in exploded side view. FIGS. 3A and 3B show the handle switch device in front view and in side view.

The handle switch device is mounted to a handle of a vehicle, e.g., a handle pipe 11 of a handle of a motorcycle.

As shown in FIGS. 1 and 2, the handle switch device mainly includes an inner casing 20, a front casing 30, a rear casing 50, and a design panel 60. The direction and position in which the handle switch device is mounted to the handle pipe 11 are not limited, and the mounting position of the handle switch device around the axis of the handle pipe 11 is not limited.

In the illustrated example, the handle switch device is mounted to a portion of the handle pipe 11, which is close to a left handle grip 10, such that the design panel 60 is disposed on the driver side and the rear casing 50 is disposed on the side to which the vehicle runs. In the following, the driver side of the handle switch device will be sometimes referred to as the front side of the handle switch device, and the side of the handle switch device to which the vehicle runs will be sometimes referred to as the rear side of the handle switch device.

The inner casing 20 is disposed on the outer periphery of the handle pipe 11, and has an annular portion 28 having an outer surface on which microswitches 13 are mounted. The microswitches 13 are electrically connected to a power source and accessories of the vehicle through a connector 29 and electric cords (not shown).

The front casing 30 (first outer casing) cooperates with the rear casing 50 (second outer casing) to constitute a two-split outer casing assembly. These casings 30, 50 are fastened and fixed together by means of fasteners, e.g., mounting screws 14A, 14B (hereinafter, sometimes collectively denoted by reference numeral 14) so as to sandwich therebetween the inner casing 20 from front and rear, and are disposed on the outer periphery of the inner casing 20. The design panel 60 is mounted to an outer peripheral face of the front casing 30.

The front and rear casings 30, 50 are provided with manipulating members respectively corresponding to the microswitches 13. More specifically, the front casing 30 is provided with manipulating members 39 to 42. Among these, the manipulating member 42 extends through a hole 64 (FIGS. 1 and 3A) formed in the design panel 60, and is exposed to the outside. The rear casing 50 is provided with manipulating members 51, 53.

The rear casing 50 is made of resin or the like and provided with a positioning boss 52 and fastening holes 57, 58 through which the mounting screws 14A, 14B are inserted. By fitting the positioning boss 52 into a positioning hole 12 formed in the handle pipe 11, the rear casing 50 is positioned relative to the handle pipe 11 in the axial and circumferential directions of the handle pipe 11.

Figure 4:
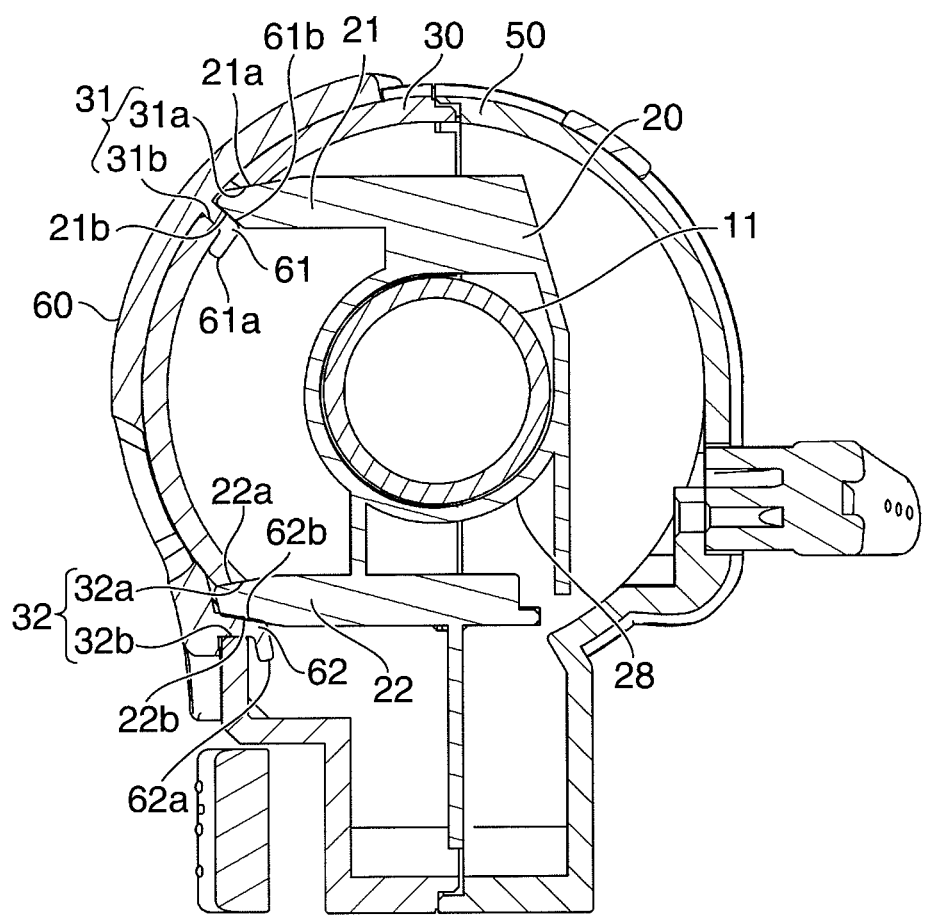
FIG. 4 is a section view taken along line A-A shown in FIG. 3A.
Figure 5A:
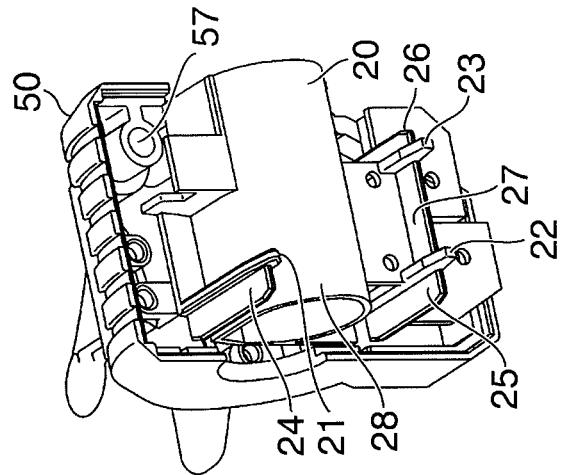
FIGS. 5A and 5B are perspective views showing an inner casing, front casing, and design panel of the handle switch device in an assembled state.
Figure 5B:
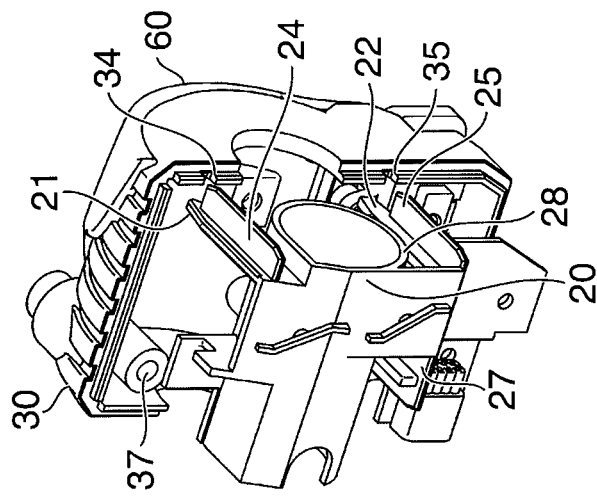
Figure 5C:
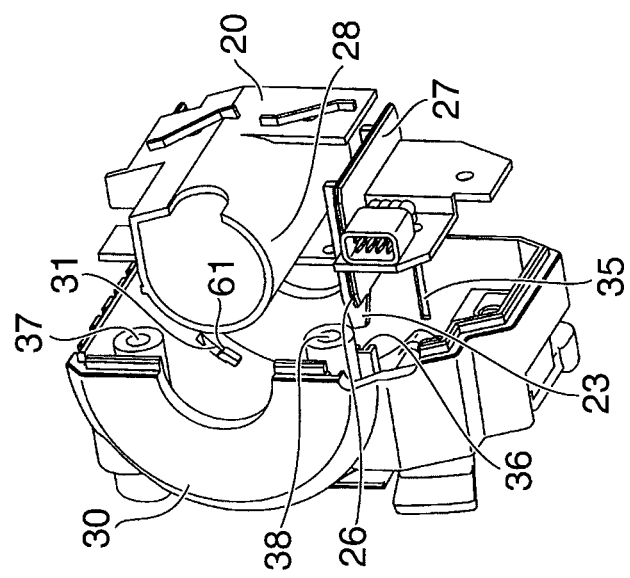
FIG. 5C is a perspective view showing the inner and rear casings in an assembled state.

FIG. 4 is a section view taken along line A-A shown in FIG. 3A. FIGS. 5A and 5B show in perspective view the inner casing 20, front casing 30, and design panel 60 in an assembled state. FIG. 5C shows in perspective view the inner and rear casings 20, 50 in an assembled state. In FIGS. 4 and 5, illustrations of the microswitch 13 and handle pipe 11 are omitted.

The construction of the inner casing 20 will be described in detail below. The inner casing 20 is made of resin or the like. As shown in e.g. FIGS. 1 and 5C, the inner casing 20 is provided at the annular portion 28 with three projection ribs 21 to 23. More specifically, the projection rib 21 is provided on an upper side of the annular portion 28 (FIGS. 2, 4, 5B, and 5C), and the projection ribs 22, 23 are provided on a lower side of the annular portion 28 (FIGS. 2, 4, and 5A to 5C). The projection ribs 21 to 23 horizontally extend toward the driver side.

The projection ribs 21, 22 are disposed at the same position in the axial direction of the handle pipe 11, and the projection ribs 22, 23 are disposed at the same position in the vertical direction of the handle pipe 11. In other words, these three projection ribs 21 to 23 are disposed at apexes of a triangle as seen from the driver side.

As shown in FIGS. 5A and 5C, the inner casing 20 is provided with a plate-like portion 27 that horizontally extends, and the projection ribs 22, 23 are formed integrally with the plate-like portion 27 that has left and right end portions extending outwardly beyond the projection ribs 22, 23 and constituting guided ribs 25, 26. At one outer side of the projection rib 21, a guided rib 24 is formed integrally therewith. The projection ribs 21 to 23 are reinforced by the guided ribs 24 to 26.

As shown in FIGS. 2 and 4, the projection rib 21 has a tip end portion tapered as seen in side view to have upper and lower tapered faces 21a, 21b. Similarly, the projection ribs 22, 23 have tip end portions tapered as seen in side view to have upper and lower tapered faces 22a, 22b; and 23a, 23b.

Next, the construction of the front casing 30 and the design panel 60 will be described in detail below. The front casing 30 is made of resin or the like and formed with fastening bosses 37, 38 respectively corresponding to the fastening holes 57, 58 of the rear casing 50 (see FIGS. 1 and 5A). The fastening bosses 37, 38 are each formed with a female thread with which a corresponding one of the mounting screws 14A, 14B is threadedly engaged.

The front casing 30 has a semi-cylindrical portion formed with through holes 31 to 33 respectively corresponding to the projection ribs 21 to 23 of the inner casing 20 (see FIGS. 1, 4, and 5A).

The front casing 30 has left and right wall portions formed with guide grooves 34 to 36 for guiding the guided ribs 24 to 26 when the projection ribs 21 to 23 of the inner casing 20 are brought in engagement with the through holes 31 to 33 of the front casing 30 and engagement pieces 61 to 63 of the design panel 60. The guide grooves 34, 35 are formed at locations corresponding to the guided ribs 24, 25 and the guide groove 36 is formed at a location corresponding to the guided rib 26 (see FIGS. 5A and 5B).

The design panel 60 is made of aluminum, carbon fiber, resin, or the like and formed into an arcuate shape in cross section conforming to the outer periphery of the front casing 30. As shown in FIGS. 2, 3A, and 4, the design panel 60 is projectingly formed with engagement pieces 61 to 63 corresponding to the through holes 31 to 33 of the front casing The engagement pieces 61 to 63 are each formed into an L-shaped hook as seen in cross section. The engagement piece 61 has a base portion extending toward the center of the design panel 60 formed into an arcuate shape in section, and has a pawl portion 61a which is bent downwardly substantially at right angles from the base portion and which can be inserted into and removed from the through hole 31 of the front casing 30. The engagement pieces 62, 63 have base portions substantially horizontally extending toward the front casing 30, and pawl portions 62a, 63a which are bent substantially at right angles from the base portions and which can be inserted into and disengaged from the through holes 32, 33 of the front casing 30.

The handle switch device is assembled and mounted to the handle pipe 11 as described below.

First, the handle pipe 11 is inserted through the annular portion 28 of the inner casing 20 mounted with the microswitches 13. Next, the positioning boss 52 of the rear casing 50 is fitted into the positioning hole 12 of the handle pipe 11, whereby the rear casing 50 is temporarily mounted to the handle pipe 11 so as to cover the inner casing 20 from the rear (i.e., from the right side in FIG. 2).

Next, the front casing 30 is covered with the design panel 60 from the front side, whereby the design panel 60 is temporarily mounted thereto. At that time, the pawl portions 61a to 63a of the engagement pieces 61 to 63 of the design panel 60 are inserted through the through holes 31 to 33 of the front casing 30, whereby the pawl portions 61a to 63a are brought in engagement with the inner face of the front casing 30, and the design panel 60 is held by the front casing 30 so as not to be detached therefrom.

Next, the front casing 30 mounted with the design panel 60 is temporarily mounted to the inner casing 20 so as to cover the inner casing 20 from the rear side. Subsequently, the mounting screws 14A, 14B are inserted through the fastening holes 57, 58 and engaged with female threads of the fastening bosses 37, 38 (see FIGS. 1 and 5A), whereby tip end portions of the projection ribs 21 to 23 are fitted into the through holes 31 to 33 of the front casing 30 (see FIG. 4, where the projection rib 23 and the through hole 33 do not appear).

As shown in FIG. 4, the through hole 31 of the front casing 30 has an upper inner face 31a slanted downwardly toward the design panel 60 (i.e., toward the left side in FIG. 4) as seen in cross section. On the other hand, the engagement piece 61 of the design panel 60 has its base portion whose upper face 61b is formed into a shape complementary to the upper inner face 31a of the through hole 31 and slanted upwardly toward the design panel 60. The upper inner face 31a of the through hole 31 of the front casing 30 and the upper face 61b of the base portion of the engagement piece 61 of the design panel 60 correspond to the tapered faces 21a, 21b of the tip end portion of the projection rib 21, respectively. Accordingly, when the tip end portion of the projection rib 21 is fitted into the through hole 31, the upper inner face 31a of the through hole 31 and the upper face 61b of the base portion of the engagement piece 61 are brought in press-contact with the tapered faces 21a, 21b of the projection rib 21, whereby a portion of the engagement piece 61 which is located in the through hole 31 is pressed against the lower inner face 31b of the through hole 31.

Similarly, the through hole 32 of the front casing 30 has an upper inner face 32a slanted downwardly toward the design panel 60 in cross section, and the engagement piece 62 of the design panel 60 has its base portion whose upper face 62b is formed into a shape complementary to the upper inner face 32a of the through hole 32 and slanted upwardly toward the design panel 60. The upper inner face 32a of the through hole 32 of the front casing 30 and the upper face 62b of the base portion of the engagement piece 62 of the design panel 60 correspond to the tapered faces 22a, 22b of the tip end portion of the projection rib 22, respectively. When the tip end portion of the projection rib 22 is fitted into the through hole 32, the upper inner face 32a of the through hole 32 and the upper face 62b of the base portion of the engagement piece 62 are brought in press-contact with the tapered faces 22a, 22b of the projection rib 22, whereby a portion of the engagement piece 62 which is located in the through hole 32 is pressed against the lower inner face 32b of the through hole 32.

Although the projection rib 23 and the through hole 33 do not appear in FIG. 4, they are the same in construction and function as the projection rib 22 and the through hole 32.

As a result, the engagement pieces 61 to 63 of the design panel 60 are fixed to the through holes 31 to 33 of the front casing 30 without play. In addition, since the pawl portions 61a to 63a of the engagement pieces 61 to 63 extend downwardly from their base portions extending through the through holes 31 to 33, a state where the engagement pieces 61 to 63 are engaged with the inner face of the front casing 30 is stably maintained to thereby prevent the engagement pieces 61 to 63 from being disengaged from the through holes 31 to 33 when the vehicle is in use, whereby the design panel 60 is stably locked and fixed to the outer casing assembly constituted by the front and rear casings 30, 50.

It should be noted that the design panel 60 can be temporarily mounted to the front casing 30 unless the mounting screws 14A, 14B are completely engaged with the fastening bosses 37, 38, irrespective of whether or not the front casing 30 has been mounted to cover the inner casing 20, as will be understood from the below-described procedures for replacement of the design panel 60.

As previously described, the rear casing 50 is prevented from rotating relative to the handle pipe 11 by the engagement of the positioning hole 12 of the handle pipe 11 and the positioning boss 52 of the rear casing 50. The front casing 30 fastened and fixed to the rear casing 50 by the mounting screws 14 is prevented from rotating relative to the handle pipe 11 through the rear casing 50. By the projection ribs 21 to 23 of the inner casing 20 being fitted into the through holes 31 to 33, the inner casing 20 is prevented from rotating relative to the handle pipe 11 through the outer casing assembly comprised of the front and rear casings 30, 50. Although the rear casing 50 is provided with the just-mentioned mechanism for rotation prevention, the handle switch device does not require other dedicated rotation prevention mechanisms. This makes it possible to simplify the device construction.

Since the through holes 31 to 33 of the design panel 60 are arranged to form a triangle as seen from the driver side, the design panel 60 can stably be mounted to the front casing 30. It should be noted that the design panel 60 can be replaceably mounted to the front casing 30 even by using only one set of engagement piece, through hole, and projection rib among three sets of the engagement pieces 61 to 63, through holes 31 to 33, and projection ribs 21 to 23. However, in order to stably mount the design panel 60 to the front housing 30, it is preferable to use at least two sets of engagement pieces, through holes, and projection ribs, which are disposed at different positions from one another in the vertical direction and in the axial direction of the handle pipe 11.

The handle switch device is assembled and mounted to the handle pipe 10 of the vehicle before shipment of vehicle. On the other hand, users have various preferences and some user wishes to replace the design panel after delivery of vehicle. Accordingly, in this embodiment, plural types of design panels that are different in design, etc. are provided to enable a user to select a desired design panel before delivery of vehicle and to obtain a desired design panel for replacement even after delivery of vehicle.

Next, a description will be given of the procedures of replacement of the design panel.

FIGS. 6A to 6C are section views each taken along line B-B in FIG. 3A, wherein FIG. 6A shows a half-engagement state where the mounting screws 14 for fixing the front an rear casings 30, 50 together have been somewhat loosened, FIG. 6B shows a panel replacement ready state where the front casing 30 has been displaced to the driver side, and FIG. 6C shows a panel removal state where the design panel 60 has been detached from the front casing. FIGS. 6D to 6F are section views each taken along line B-B in FIG. 3A and respectively showing a half-engagement state, a panel replacement ready state, and a panel removal state.

To detach the design panel 60 from the front casing 30, the mounting screws 14 in the handle switch device are moderately loosened and brought into a half-engagement state (FIGS. 6A and 6D). In the half-engagement state, the mounting screws 14A, 14B are half way engaged with female threads of the fastening bosses 37, 38, and the front casing 30 can be displaced toward the driver side (i.e. toward the retraction side) in the front-rear direction for a sufficient stroke in which the tip end portions of the projection ribs 21 to 23 of the inner casing 20 can be disengaged from the through holes 31 to 33 of the front casing 30 so as to be out of contact with the engagement pieces 61 to 63 of the design panel 60.

When the mounting screws 14 are in the half-engagement state, the front casing 30 can be displaced toward the driver side to obtain the panel replacement ready state shown in FIGS. 6B and 6E, in which the design panel 60 is temporarily mounted to the front casing 30. Next, the design panel 60 is displaced in a direction shown by arrows in FIGS. 6C and 6F to disengage the engagement pieces 61 to 63 of the design panel 60 from the through holes 31 to 33 of the front casing 30, thereby detaching the design panel 60 from the front casing 30.

Next, a new design panel 60 is mounted to the front casing 30. To this end, the engagement pieces 61 to 63 of the new design panel 60 are first inserted into the through holes 31 to 33 of the front casing 30, whereby the new design panel 60 is temporarily mounted to the front casing 30 (FIGS. 6B and 6E). Then, the mounting screws 14A, 14B which are in the half-engagement state (FIGS. 6A and 6D) are tightened so as to be completely engaged with the male threads of the fastening bosses 37, 38. As a result, the new design panel 60 is stably locked and fixed to the outer casing assembly, whereby the design panel replacement is completed.

As described above, the design panel 60 can be detached from the front casing 30 by simply loosening the mounting screws 14 without completely separating the front and rear casings 30, 50 from each other. To mount a new design panel 60 to the front casing 30, it is only required to tighten the temporarily loosened mounting screws 14. Accordingly, complicated work for panel replacement becomes unnecessary.

According to this embodiment, the engagement pieces 61 to 63 of the design panel 60 can be inserted and detached from the through holes 31 to 33 of the front casing 30 in a state where the front and rear casings 30, 50 are not fastened together but not completely separated from each other, whereby the design panel 60 can be mounted to and dismounted from the front casing 30. When the front and rear casings 30, 50 are completely fastened and fixed together by means of the mounting screws 14, the engagement pieces 61 to 63 of the design panel 60 are brought in engagement with the projection ribs 21 to 23 to prevent the engagement pieces 61 to 63 from being disengaged from the through holes 31 to 33, whereby the design panel 60 is stably fixed to the outer casing assembly.

The replacement of the design panel can be carried out by slightly loosening the mounting screws 14 (i.e., fasteners for the outer casing assembly) without completely separating the front and rear casings 30, 50 that constitute the outer casing assembly. Design panels for replacement, which are high in the degree of design, can be formed by using, e.g., a higher-grade material than that for the front and rear casings 30, 50.

In a state where the front and rear casings 30, 50 are assembled together, the tapered face 21a of the projection rib 21 of the inner casing 20 functions to press the engagement piece 61 of the design panel 60 against the lower inner face 31b of the through hole 31 of the front casing 30, whereby the design panel 60 is stably fixed without play.

Since the engagement pieces 61 to 63 of the design panel 60 are provided at their tip end portions with the pawl portions 61a to 63a, the design panel 60 temporarily mounted to the front casing 30 is not easily unintentionally detached therefrom, thus contributing to the ease of mounting work of the design panel 60.

In a state where the projection ribs 21 to 23 of the inner casing 20 are inserted into the through holes 31 to 33 of the front casing 30, the inner casing 20 is prevented through the outer casing assembly from being rotated relative to the handle pipe 11. Thus, the inner casing 20 is unnecessary to be provided with a mechanism dedicated for rotation prevention, resulting in simple construction.

Since the front casing 30 is provided with the guide grooves 34 to 36 for guiding the guided ribs 24 to 26 of the inner casing 20, it becomes easy to perform operations for positioning and assembling the inner and front casings 20, 30. As a result, the manipulating members and the microswitches 13, etc., can easily be positioned relative to each other, and play or rattle between the inner and front casings 20, 30 can be reduced for satisfactory switch operation.

It should be noted that in the above embodiment, the guided ribs 24 to 26 are formed integrally with the projection ribs 21 to 23 of the inner casing 20. Alternatively, the guided ribs can be provided in the front casing 30. In that case, the guide grooves 34 to 36 for guiding the guided ribs 24 to 26 are provided in the inner casing 20. Furthermore, the shapes and locations of the guided ribs and guide grooves are not limited to illustrated ones.

Moreover, all the three sets of engagement pieces 61 to 63 of the design panel 60, through holes 31 to 33 of the front casing 30, and projection ribs 21 to 23 of the inner casing 20 can be provided on one vertical side (upper half or lower half) of the annular portion 28 of the inner casing 20.

It is not inevitably necessary that tapered faces are provided both on the projection ribs 21 to 23 and the engagement pieces 61 to 63 (which are pressed by the projection ribs 21 to 23 against the lower inner faces of the through holes 31 to 33). It is enough to provide tapered faces on either the projection ribs 21 to 23 or the engagement pieces 61 to 63 so as to be in contact with another of the projection ribs 21 to 23 and the engagement pieces 61 to 63.

(Second Embodiment)

A handle switch device according to a second embodiment of this invention differs in shapes of the inner and rear casings 20, 50 from those of the first embodiment, but is the same in other constructions as the first embodiment.

Figure 7:
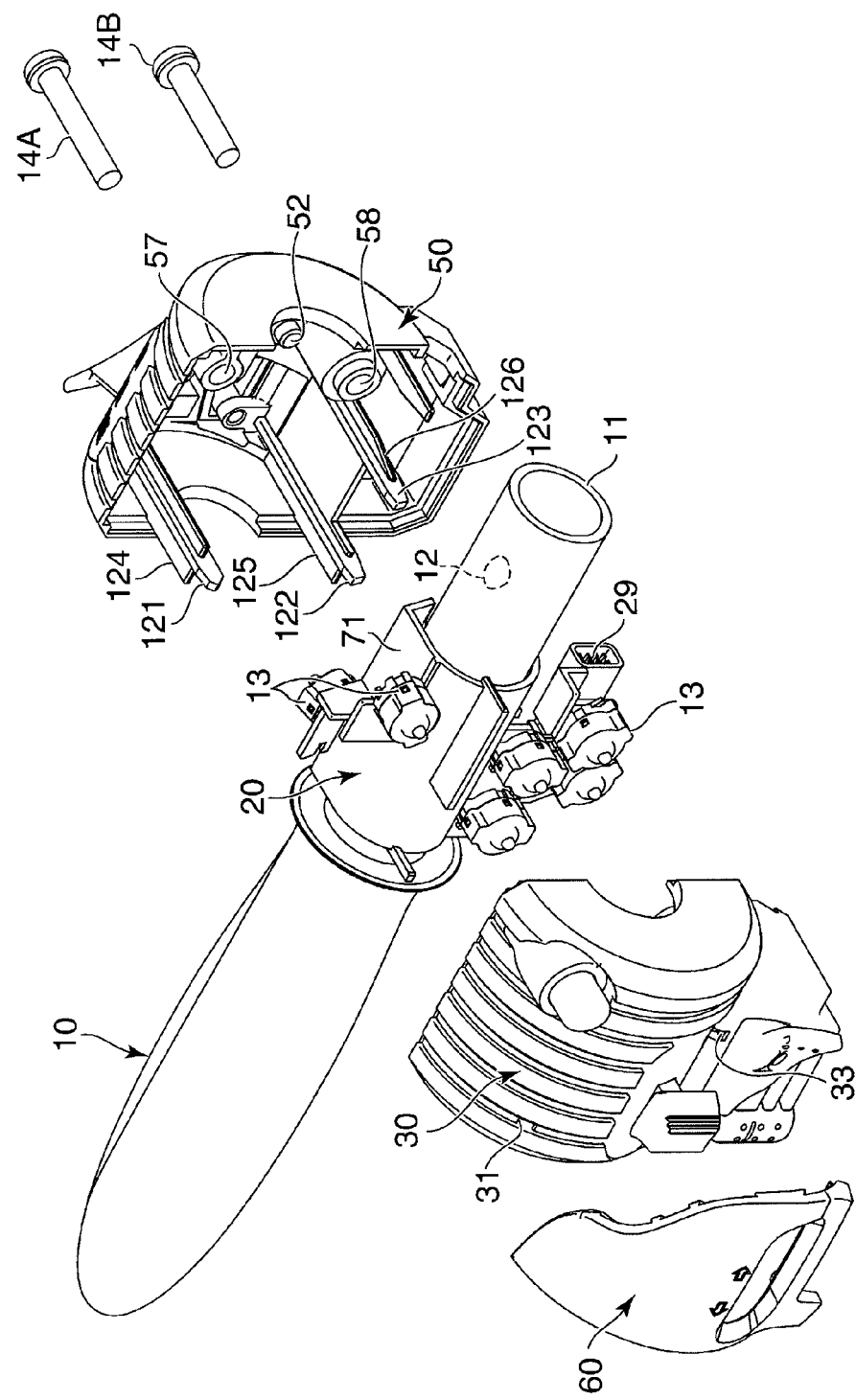
FIG. 7 is an exploded perspective view of a handle switch device to which a mounting structure according to a second embodiment of this invention is applied.
Figure 8:
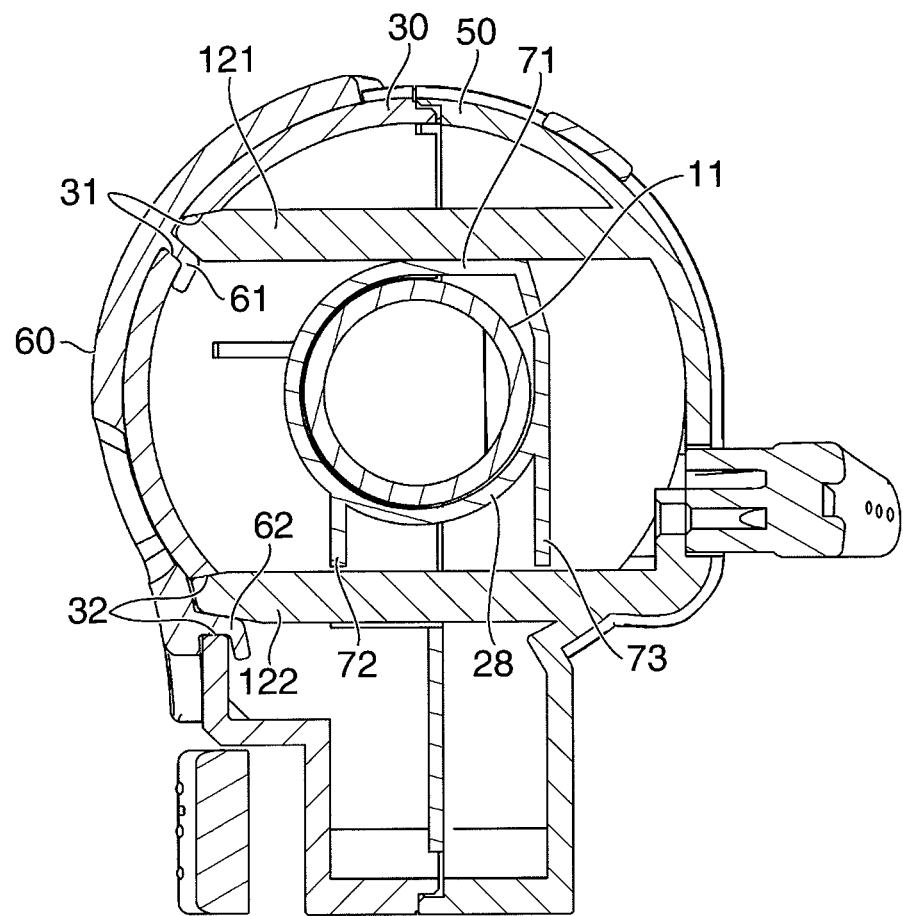
FIG. 8 is a section view, similar to FIG. 4, of the handle switch device.

FIGS. 7 and 8 show in exploded perspective view and in section view a handle switch device to which a mounting structure according to the second embodiment is applied.

In this embodiment, projection ribs 121 to 123 and guided ribs 124 to 126 (respectively corresponding to the projection rib 21 to 23 and guided ribs 24 to 26 of the inner casing 20 of the first embodiment) are provided on the rear casing 50. The inner casing 20 of this embodiment is provided with engagement portions 71 to 73 that are engaged with the projection ribs 121 to 123 and that function to prevent, through the rear casing 50, the inner casing 20 from rotating relative to the handle pipe 11.

As shown in FIG. 7, the projection ribs 121 to 123 are formed on the inside of the rear casing 50 at positions corresponding to the through holes 31 to 33 of the front casing 30. The guided ribs 124 to 126 of the rear casing 50 are formed integrally with the projection ribs 121 to 123, respectively, and are guided by the guide grooves 34 to 36 of the front casing 30 as with the case of the first embodiment (FIGS. 5A and 5B).

As shown in FIG. 8, the projection ribs 121 to 123 have tip end portions that are each formed into a tapered shape in side view, as with the projection ribs 21 to 23. It should be noted that the projection rib 123 does not appear in FIG. 8. As with the case of the first embodiment, the projection ribs 121 to 123 are engaged with the through holes 31 to 33 of the front casing 30 and the engagement pieces 61 to 63 of the design panel 60.

The engagement portion 71 for rotation prevention (hereinafter, referred to as the upper engagement portion 71) is formed on an upper part of the annular portion 28 of the inner casing 20, and the engagement portions 72, 73 for rotation prevention (hereinafter, referred to as the lower engagement portions 72, 73) are formed on a lower part of the annular portion 28. Distances between an upper end of the upper engagement portion 71 and lower ends of the lower engagement portions 72, 73 are substantially the same as distances between the upper projection rib 121 and the lower projection ribs 122, 123.

Since the engagement portions 72, 73 are provided at positions that are separated away from each other in the front-rear direction, the inner and rear casings 20, 50 assembled together are not rotated relative to each other, whereby the inner casing 20 is prevented through the rear casing 50 from rotating relative to the handle pipe 11. The engagement portions 71 to 73 function as mounting guides when the rear casing 50 is temporarily mounted to the inner casing 20.

According to this embodiment, as with the case of the first embodiment, the design panel 60 can be mounted, dismounted, and replaced by manipulating the mounting screws 14, and the inner casing 20 can be prevented from rotating relative to the handle pipe 11 without providing a dedicated rotation prevention mechanism.

It should be noted that engagement portions provided in the inner casing 20 for engagement with the projection ribs 121 to 123 to prevent the inner and rear casings 20, 50 from rotating relative to each other are not limited to the engagement portions 71 to 73. For example, the engagement portions can be constituted by complete or incomplete holes of any shape, which extend in the front-rear direction and through which the projection ribs 121 to 123 are inserted.

(Third Embodiment)

A handle switch device according to a third embodiment of this invention differs in shapes of the inner, front, and rear casings 20, 30, and 50 from those of the first embodiment, but is the same in other constructions as the first embodiment.

Figure 9:
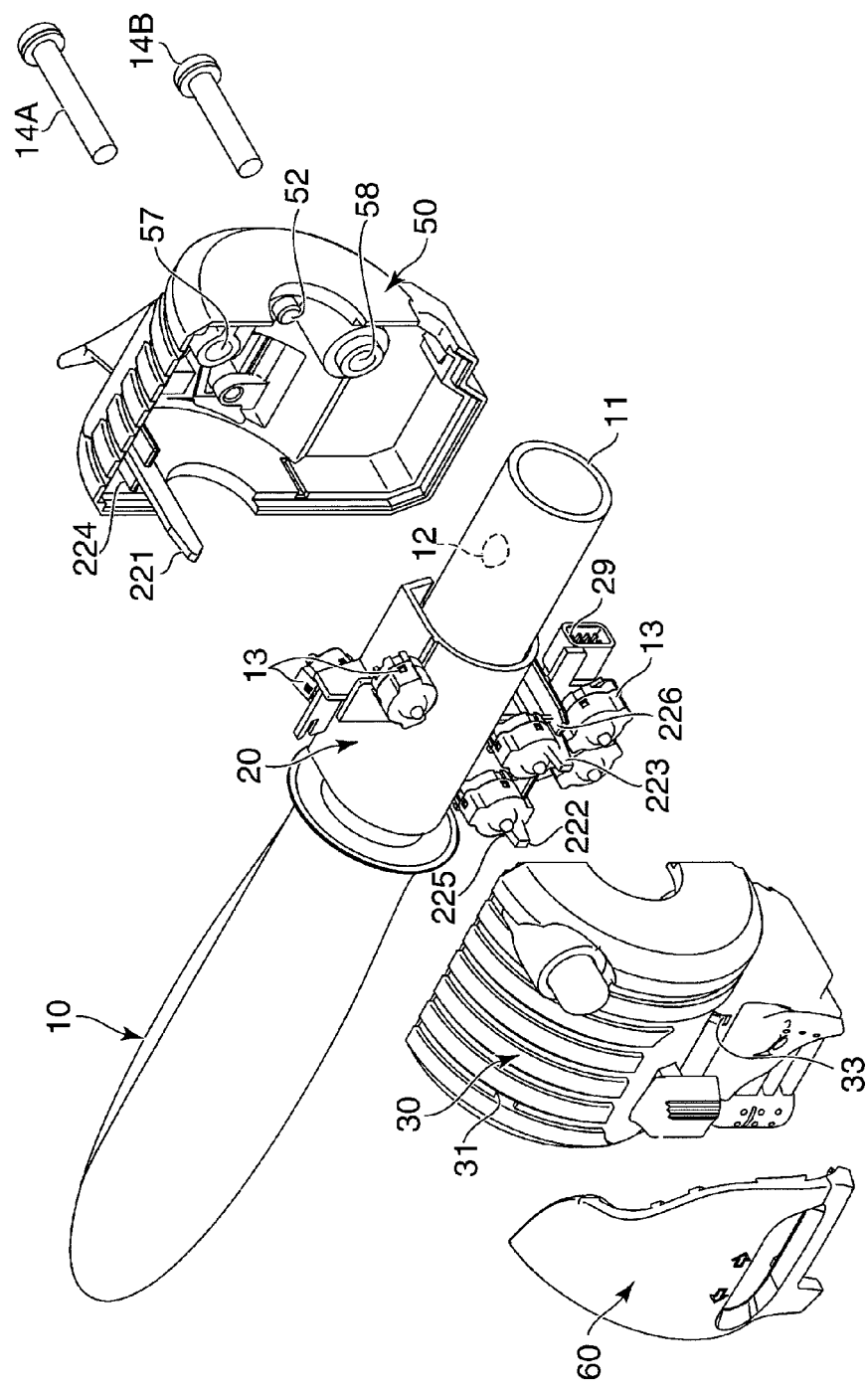
FIG. 9 is an exploded perspective view of a handle switch device to which a mounting structure according to a third embodiment of this invention is applied.
Figure 10:
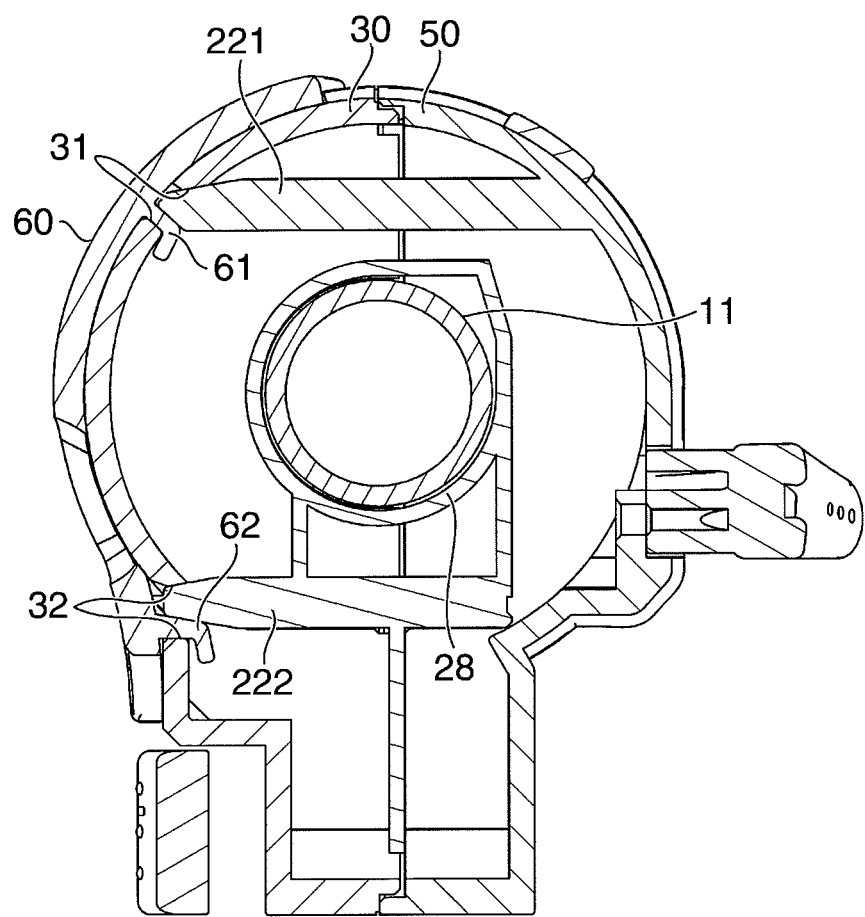
FIG. 10 is a section view, similar to FIG. 4, of the handle switch device.

FIG. 9 shows in exploded perspective view a handle switch device to which a mounting structure according to the third embodiment is applied, and FIG. 10 is a section view, similar to FIG. 4, of the handle switch device.

In this embodiment, the projection ribs 221 to 223 corresponding to the projection ribs 21 to 23 provided on the inner casing 20 in the first embodiment are provided separately on the inner casing 20 and on the rear casing 50. Also, the guided ribs 224 to 226 corresponding to the guided ribs 24 to 26 provided on the inner casing 20 in the first embodiment are provided separately on the inner casings 20 and on the rear casing 50.

As shown in FIG. 9, the projection rib 221 is formed on an upper inner part of the rear casing 50 at a position corresponding to the through hole 31 of the front casing 30. The projection ribs 222, 223 are formed on the inner casing 20 at positions corresponding to the through holes 32, 33 of the front casing 30. The guided ribs 224 to 226 are formed integrally with respective ones of the projection ribs 221 to 223.

Guide grooves (not shown) corresponding to the guide grooves 34 to 36 (FIGS. 5A and 5B) and having lengths suitable for guiding the guided ribs 224 to 226 are formed in the front casing 30 at positions suitable for guiding the guided ribs 224 to 226. The front casing 30 is the same in other constructions as the first embodiment.

As shown in FIG. 10, the projection ribs 221 to 223 have tip end portions that are each formed into a tapered shape in side view, as with the projection ribs 21 to 23. As with the case of the first embodiment, the projection ribs 221 to 223 are engaged with the through holes 31 to 33 of the front casing 30 and the engagement pieces 61 to 63 of the design panel 60.

By the projection ribs 222, 223 fitted into the through holes 32, 33, the inner casing 20 is prevented through the outer casing assembly (front and rear casings 30, 50) from rotating relative to the handle pipe 11.

According to this embodiment, as with the case of the first embodiment, the design panel 60 can be mounted, dismounted, and replaced by manipulating the mounting screws 14, and the inner casing 20 can be prevented from rotating relative to the handle pipe 11 without providing a dedicated rotation prevention mechanism.

It should be noted that in the above-described embodiments, the projection rib 21 has the tapered face 21a that functions to press the engagement piece 61 against the lower inner face 31b of the through hole 31 in order to stably fix the design panel 60. However, this is not limitative.

In the following, a description will be given of a modification of the projection ribs, which can be applied to the first embodiment.

Figure 11:
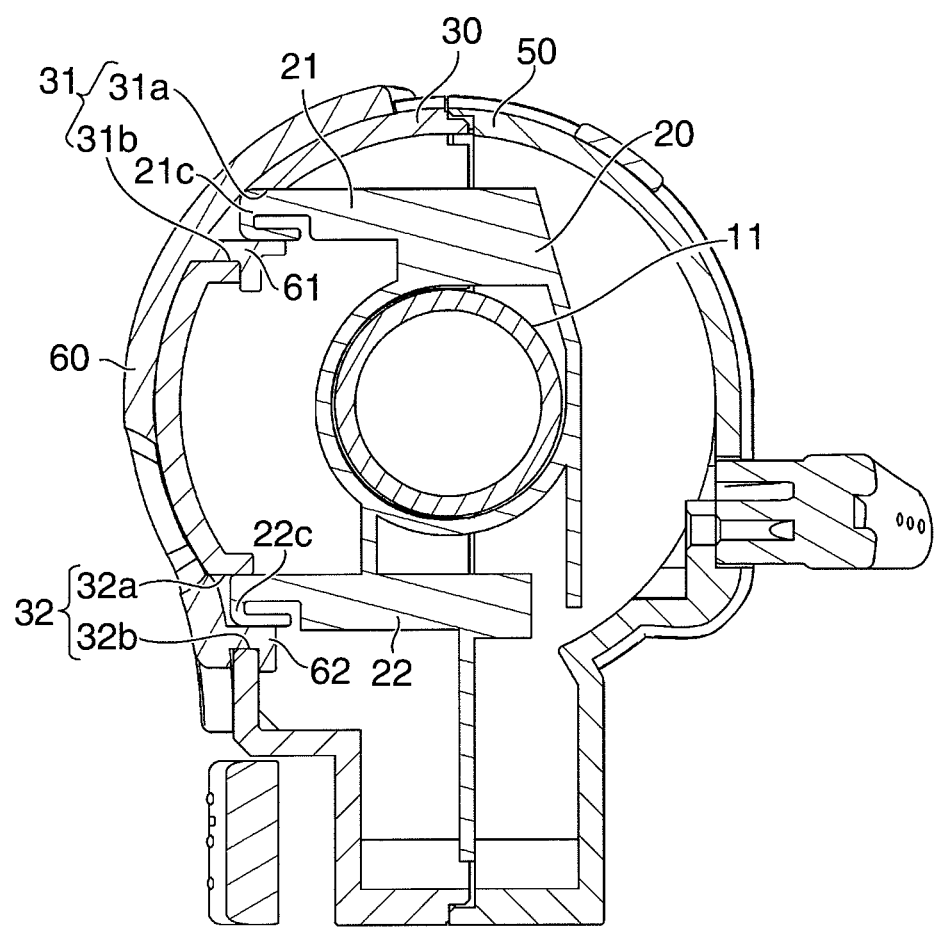
FIG. 11 is a section view, similar to FIG. 4, of a handle switch device provided with projection ribs according to a modification of the first embodiment.

FIG. 11 shows, in section view similar to FIG. 4, a handle switch device provided with projection ribs according to a modification of the first embodiment.

The projection ribs 21, 22 have their tip end portions that are each bent into a U-shape and that constitute elastic portions 21c, 22c having spring-like elasticity. When fitted into the through holes 31, 32, the elastic portions 21c, 22c elastically press the engagement pieces 61, 62, whereby the engagement pieces 61, 62 are pressed against the lower inner faces 31b, 32b of the through holes 31, 32. An elastic portion similar to the elastic portions 21c, 22c is provided at a tip end portion of the projection rib 23 that does not appear in FIG. 11.

With the above construction, the design panel 60 is stably fixed without play. In particular, such a fixed state of the design panel 60 can satisfactorily be maintained by elastic forces of the elastic portions 21c, 22c and the non-illustrated elastic portion, even if the design panel 60 is frequently replaced.

It should be noted that elastic portions corresponding to the elastic portions 21c, 22c and the non-illustrated elastic portion can be provided in the engagement pieces 61 to 63. Alternatively, such elastic portions can be provided in both the projection ribs 21 to 23 and the engagement pieces 61 to 63.

In the first to third embodiments, the front and rear casings 30, 50 are fastened together by the mounting screws 14 and prevented from rotating relative to each other. Furthermore, the inner casing 20 and the front and rear casings 30, 50 are prevented from rotating relative to each other by the projection ribs 21 to 23 of the inner casing 20 being fitted into the through holes 31 to 33 of the front casing 30 in the first embodiment or by the projection ribs 121 to 123 of the rear casing 50 being engaged with the engagement portions 71 to 73 of the inner casing 20 in the second embodiment or by the projection ribs 222, 223 of the inner casing 20 being fitted into the through holes 32, 33 of the front casing 20 in the third embodiment.

Accordingly, a mechanism (corresponding to, e.g., the positioning hole 12 and the positioning boss 52) that prevents the entire handle switch device from rotating relative to the handle pipe 11 is not inevitably necessary to be provided in the rear casing 50, but can be provided in the inner casing 20 or in the front casing 30.

It should be noted that the inner casing 20 of each of the embodiments is formed into one piece and has the annular portion 28 through which the handle pipe 11 is inserted. Alternatively, the inner casing 20 can be formed into a two-split structure where a positioning boss corresponding to the positioning boss 52 fitted to the positioning hole 12 can easily be provided in the inside of the inner casing 20.

In each above embodiment, fasteners for fastening the front and rear casings 30, 50 together are not limited to the mounting screws 14. Preferably, fasteners can each be brought in a half-engagement state having a stroke sufficient to release the engagement between the projection ribs 21 to 23 of the inner casing 20 and the engagement pieces 61 to 63 of the design panel 60.

In each embodiment, the design panel 60 for improving the outer appearance has been described as an example of a replaceable panel. However, this invention is also applicable to a protection panel, a reinforcement panel, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264527, filed Dec. 2, 2011, which is hereby incorporated by reference herein in its entirety.

What is claimed is:

1. A mounting structure of a handle switch device configured to be mounted to a bar handle of a vehicle, comprising:
   an inner casing provided with switches thereon and configured to be disposed on an outer periphery of the handle;
   an outer casing assembly comprised of first and second outer casings and disposed on an outer periphery of said inner casing, said first outer casing being formed with at least one through hole;
   at least one fastener configured to fasten said first and second outer casings together;
   a panel provided with at least one engagement piece corresponding to the through hole formed in said first outer casing, said panel being configured to be disposed on an outer periphery of said first outer casing in a state that the engagement piece extends through the through hole; and
   at least one projection provided at least in either said second outer casing or said inner casing,
   wherein said panel can be mounted to and dismounted from said first outer casing by inserting and disengaging the engagement piece of said panel into and from the through hole of said first outer casing in a state where said first and second outer casings are not fastened together by the fastener, and
   said panel is fixed to said outer casing assembly by inserting the engagement piece of said panel through the through hole formed in said first outer casing and by engaging the engagement piece of said panel with the projection provided at least in either said second outer casing or said inner casing.

2. The mounting structure of the handle switch device according to claim 1, wherein said at least one fastener is a screw, and
   the engagement piece of said panel can be disengaged from said projection provided at least in either said second outer casing or said inner casing by bringing the screw into a half-engagement state, whereby said panel can be mounted to and dismounted from said first outer casing.

3. The mounting structure of the handle switch device according to claim 1, wherein a tapered face is provided in at least either said engagement piece of said panel or said projection that is provided at least in either said second outer casing or said inner casing, and
   the tapered face functions to press the engagement piece of said panel against an inner face of the through hole of the first outer casing in a state that said projection is in engagement with the engagement piece.

4. The mounting structure of the handle switch device according to claim 1, wherein an elastic portion is provided in at least either said engagement piece of said panel or said projection that is provided at least in either said second outer casing or said inner casing, and
   the elastic portion functions to press the engagement piece of said panel against an inner face of the through hole of the first outer casing in a state that said projection is in engagement with the engagement piece.

5. The mounting structure of the handle switch device according to claim 1, wherein said engagement piece of said panel has a base portion extending through the through hole of said first outer casing, and a pawl portion bent downwardly from the base portion in a state where the handle switch device is mounted to the handle.

6. The mounting structure of the handle switch device according to claim 1, wherein said at least one engagement piece and said at least one through hole are at least two sets of engagement pieces and through holes, which are disposed at different positions in a vertical direction and in an axial direction of the handle.

7. The mounting structure of the handle switch device according to claim 1, wherein said projection is provided on said inner casing,
   a rotation preventing portion to achieve rotation prevention against the handle is provided in either said outer casing assembly or said inner casing, and
   through either said outer casing assembly or said inner casing, either another of said outer casing assembly or said inner casing is prevented from rotating relative to the handle by said projection provided on said inner casing being fitted into said through hole of said first outer casing.

8. The mounting structure of the handle switch device according to claim 1, wherein said at least one projection is provided on said second outer casing,
   a rotation preventing portion to achieve rotation prevention against the handle is provided in either said outer casing assembly or said inner casing,
   said inner casing is provided with at least one engagement portion for engagement with said at least one projection provided on said second outer casing, and
   through either said outer casing assembly or said inner casing, either another of said outer casing assembly or said inner casing is prevented from rotating relative to the handle by said projection being in engagement with said engagement portion.

9. The mounting structure of the handle switch device according to claim 1, wherein said projection is provided on said inner casing,
   said inner casing is provided with at least one guided portion, and
   said first outer casing is provided with at least one guide portion for guiding the at least guided portion when said projection provided on said inner casing is brought in engagement with said engagement piece of said panel.

10. The mounting structure of the handle switch device according to claim 1, wherein said projection is provided on said second outer casing,
    said second outer casing is provided with at least one guided portion, and
    said first outer casing is provided with at least one guide portion for guiding the at least guided portion when said projection provided on said second outer casing is brought in engagement with said engagement piece of said panel.

* * * * *

UNITED STATES PATENT AND TRADEMARK OFFICE
CERTIFICATE OF CORRECTION

PATENT NO.        : 8,763,746 B2                                        Page 1 of 1
APPLICATION NO.   : 13/691084
DATED             : July 1, 2014
INVENTOR(S)       : Tsutomu Tozuka It is certified that error appears in the above-identified patent and that said Letters Patent is hereby corrected as shown below:

On the Title page of the issued patent the 2nd inventor's name now reads "Shigeharu Nazu" should read --Shigeharu Nezu--

Signed and Sealed this
Seventeenth Day of February, 2015

Michelle K. Lee
*Deputy Director of the United States Patent and Trademark Office*